May 26, 1931.  H. V. LOUGH  1,806,811
TREAD SHRINKING MACHINE
Filed Sept. 19, 1928  3 Sheets-Sheet 1

INVENTOR
Hector V. Lough
BY
ATTORNEY

May 26, 1931.   H. V. LOUGH   1,806,811
TREAD SHRINKING MACHINE
Filed Sept. 19, 1928   3 Sheets-Sheet 2

Fig. 2.

INVENTOR
Hector V. Lough
BY Ernest Hopkinson
ATTORNEY

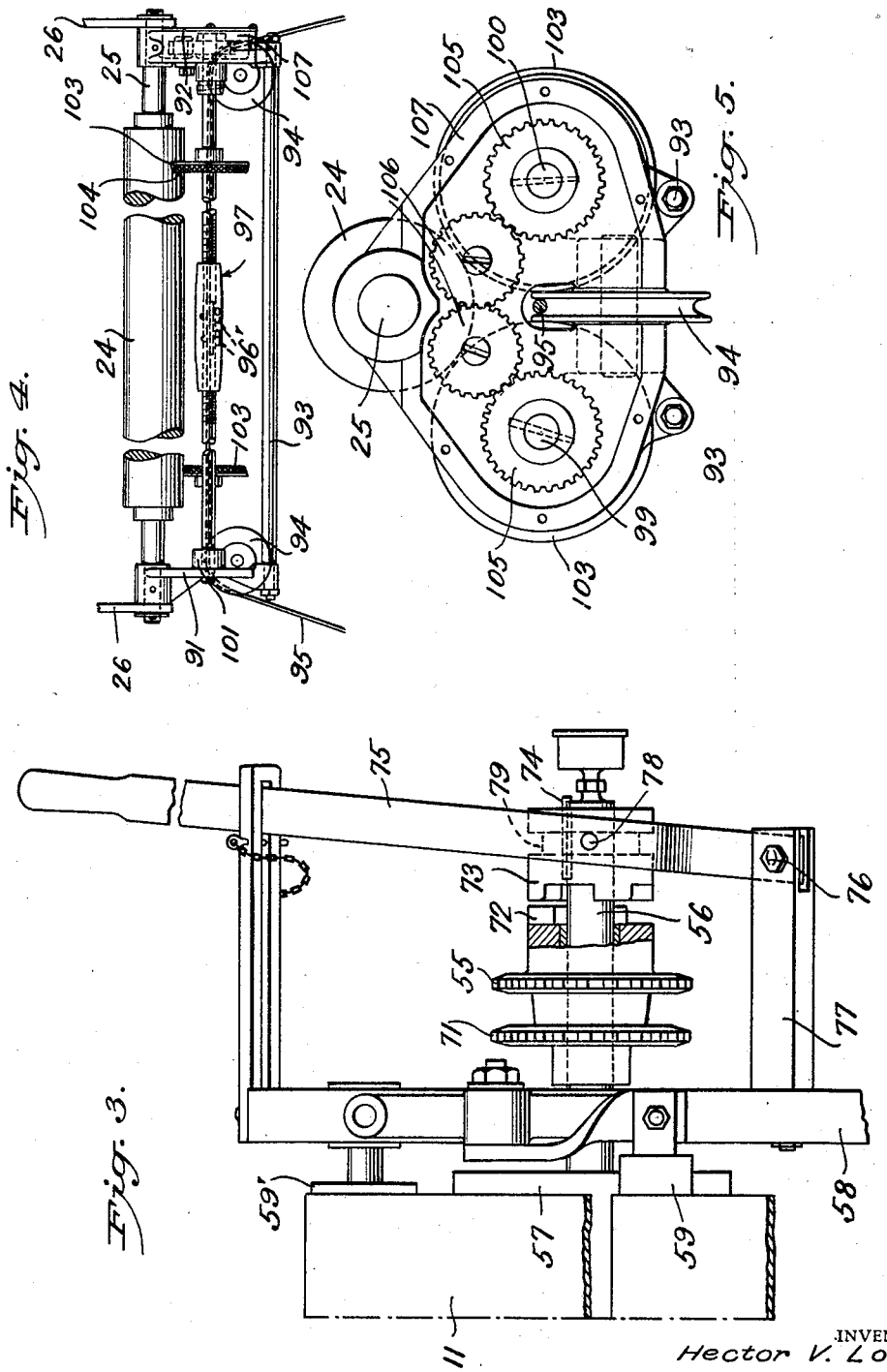

Patented May 26, 1931

1,806,811

UNITED STATES PATENT OFFICE

HECTOR V. LOUGH, OF HARTFORD, CONNECTICUT, ASSIGNOR TO THE HARTFORD RUBBER WORKS CO., OF HARTFORD, CONNECTICUT, A CORPORATION OF CONNECTICUT

TREAD SHRINKING MACHINE

Application filed September 19, 1928. Serial No. 306,974.

This invention pertains to a machine for and method of shrinking uncured rubber stock, such as tread rubber for tires.

Tread rubber as delivered by a calender or tubing machine will shrink if the cut lengths are exposed to the air. This shrinking is caused by the efforts of the rubber to relieve the internal mechanical strain set up by the calendering or tubing process. These are largely longitudinal strains, and owing to the uncured semi-plastic state of the rubber, they do not assert themselves with the snap of cured rubber but draw back sluggishly. The rubber therefore requires several minutes under the most favorable conditions to complete its shrinking. If a number of cut lengths are put in a book, the shrinking may continue for several hours. It is therefore evident that the exact length necessary to go around a tire cannot be accurately cut from the stock until the rubber is through shrinking.

Heretofore various schemes have been proposed or used to overcome the difficulty, such as keeping the calendered stream of rubber stock traveling on conveyors for long distances before arriving at the cutting table so as to allow the rubber time to shrink. Another way was to cool the stream of stock by passing it through long troughs of water, but it has been found that shrinking is not altogether dependent upon cooling; besides the sudden cooling causes the sulphur component of the rubber to come to the surface in the form of a bloom, making the rubber unsuitable for use.

It is therefore an object of this invention to overcome the foregoing defects and to provide means for mechanically shrinking the tread stock, whereby it leaves the machine in satisfactorily shrunk condition, and may be cut immediately to proper lengths to fit the tires.

Another object of the invention is to provide means for controlling the degree of shrinkage for different stocks.

Other objects and advantages will appear as the description proceeds.

In the accompanying drawings:

Fig. 2 is a plan view thereof;

Fig. 3 represents a clutch mechanism; and

Figs. 4 and 5 are details of a belt centering device.

Figure 1:
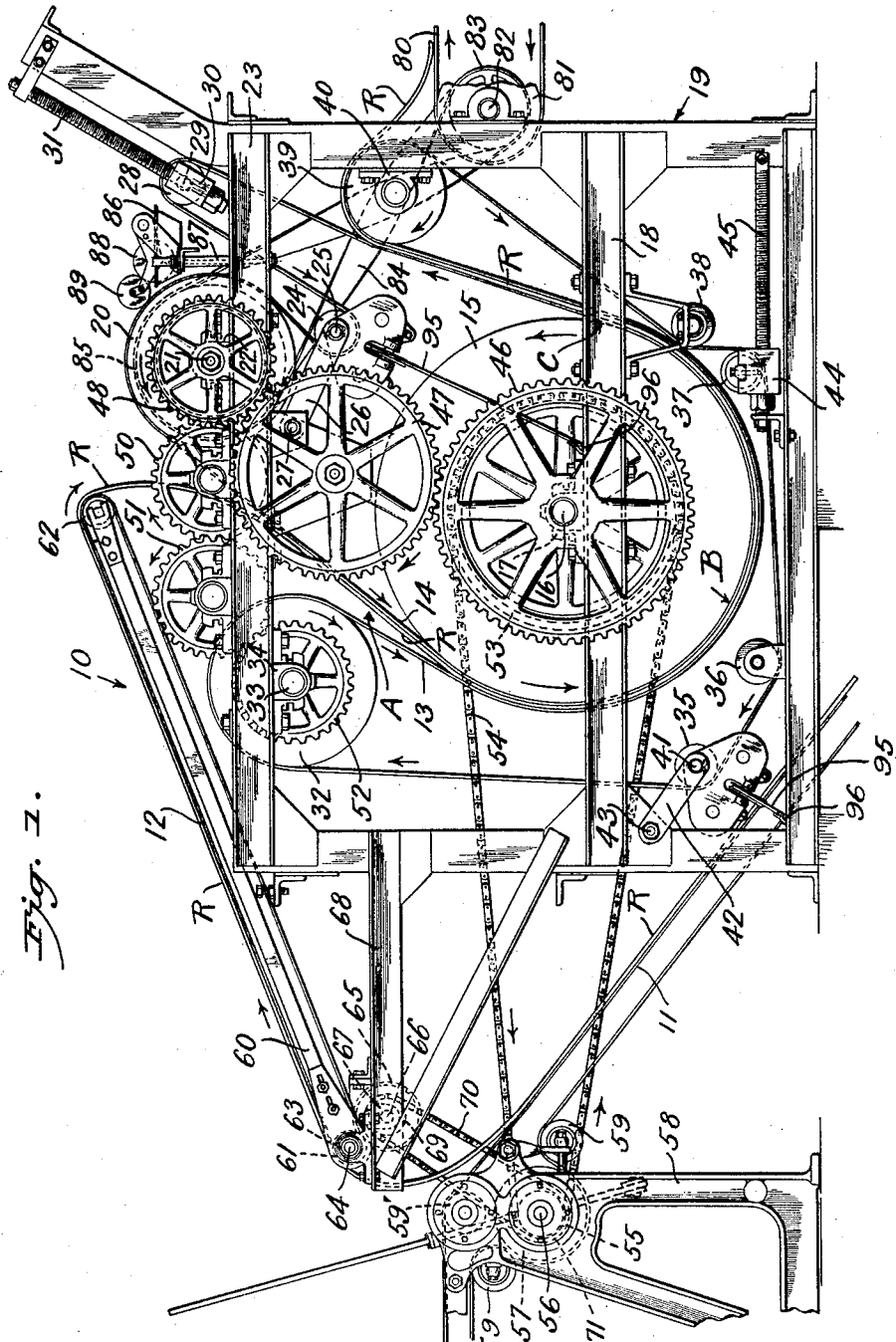
Fig. 1 is a side elevation of a machine embodying the invention.

In the accompanying drawings which illustrate one practical embodiment of the invention, the reference character 10 represents generally a tread shrinking machine through which a stream of uncured rubber stock R is adapted to be run for the purpose of shrinking the stock before cutting to tire lengths. In its course through the machine, the rubber stock R travels upward on an endless conveyor 11 from a calender or tubing machine (not shown) preferably on a lower floor level, as indicated in Fig. 1. From the upper end of the conveyor 11, the stock is taken on to a second conveyor designated 12 at the top of the machine, which carries the stock along to position above a pair of endless elastic elements in the form of belts 13 and 14 between which the stream of rubber stock R feeds downward from the end of the conveyor 12. The elastic belt 14, which may be referred to as the inner belt, is in surface contact with approximately the lower half of a relatively large drum 15 having a shaft 16 mounted in suitable bearings 17 secured to cross members 18 of the frame 19 of the machine. The inner belt 14 passes around a cylinder 20 fixed to a shaft 21 mounted in bearings 22 of the upper cross members 23 of the frame 19, then around an idler roller 24 having a shaft 25 journalled in links 26 which are loosely pivoted at 27 to the cross members 23, and then around another idler roller 28 having a shaft 29 carried in bearing blocks 30 which are adjustable by means of threaded rods 31 adapted to tighten or loosen the tension of the inner belt 14 against the drum 15. The outer elastic belt 13 also extends around the lower half of the cylinder 15 in superposed relation to the belt 14 and the stream of uncured rubber composition R is interposed and tightly gripped between the two belts due to the fact that they are both held under tension against the drum 15. The outer belt 13 is also trained around a cylinder 32 having a shaft 33 journalled in bearings 34 secured to the upper cross members 23, then around idler rollers 35, 36, 37, 38 adjacent the bottom of the machine, and then around a large roller 39 rotating in bearings 40, the idler roller 35 being mounted on a shaft 41 carried by links 42 which are loosely pivoted at 43 to the frame 19. The idler roller 37 is preferably mounted in bearing blocks 44 which are adjustable along threaded rods 45 so as to properly tension the outer belt 13 against the drum 15. The endless belts 13 and 14 are wider than any of the rubber that the machine is intended to handle and are put under considerable tension against the surface of the cylinder 15 whereby to cause friction of the inner belt 14 against said surface and to also cause the outer belt 13 to tightly grip the portions of the rubber stream R surrounding the drum 15, so that the rubber R is held tightly by both of the elastic belts and cannot slip with respect thereto. The drum 15 is revolved in the direction of the arrows at a surface speed approximately the same as the conveyor 11 which feeds the stream of hot rubber R to the machine. The two other cylinders 20 and 32 are revolved in the direction of the arrows at surface speeds that are, for example, 10, 15 or 20% slower than the drum 15. Due to this variation in surface speeds, the cylinders 20 and 32 do not deliver the elastic belts 13 and 14 as fast as the drum 15 wants to take them up, so that the two belts 13 and 14 at the zone A above the drum 15 are heavily stretched in addition to the original tension given them by the adjustment of the idler rollers 28 and 37. The two belts 13 and 14 are therefore fed to the drum 15 in a superstretched condition and travel around with the drum to about the zone B where they begin to slip slightly with respect to the surface of the drum 15, and consequently the belts contract. The rubber stock R being tightly gripped between the two belts partakes of their contraction. There is thus begun a mechanical consolidation or shrinking of the rubber R as it reaches zone B with the belts 13 and 14. The speed of the belts 13 and 14 becomes slower and slower due to slippage, until at the point C where they leave the drum 15, the tension has become normal and the speed of the elastic belts at this point is the same as the surface speeds of the cylinders 20 and 32. The contraction of the belts from superstretched condition to normal condition, that is the contraction in moving from zone A, through B, to C, causes mechanical condensation of the rubber R equal to the percentage of shrinkage desired, or the differences in surface speeds between the cylinders 20 and 22, and the drum 15.

Various means may be employed for revolving the cylinders 20 and 32 and the drum 15 to effect the desired variation in surface speeds, for instance, the shaft 16 of the drum 15 may have secured thereto a gear 46 arranged to mesh with a suitably mounted idler gear 47 which in turn meshes with a gear 48 fast to the shaft 21 of the cylinder 20. A gear 49 fast to the shaft 21 is connected through two idler gears 50 and 51 to a gear 52 fastened to the shaft 33 of the other cylinder 32. The larger cylinder may have a sprocket wheel 53 for a chain 54 driven by a smaller sprocket wheel 55 on a shaft 56 secured to a roller 57 mounted in standards 58. The descending side of the endless conveyor 11 is held frictionally around the roller 57 by means of a pair of idlers 59, and motion is parted to the conveyor 11 by any suitable power means, such as a motor (not shown) whereby the belt continuously moves upward from the floor level below, conveying the rubber stream R upward to the machine. The rising side of the conveyor 11 runs over a roller 59' supported by the standards 58. It will be seen that revolving the roller 57 through the medium of conveyor 11 imparts motion to the shaft 56 and thereby drives the sprocket 55 and the chain 54. The chain 54 being connected to the drum 15 causes motion of the belts 13 and 14 by reason of the train of gears connecting the two cylinders 20 and 32 to the drum 15. It will also be understood that the gears comprising the train of driving connections for the belts may be removed and other different gears substituted whereby to change the ratio of surface speeds between the cylinders 20 and 32 and the drum 15, so that the proper amount of contraction may be obtained for the belts 13 and 14 to suit the stock R. The upper conveyor 12 is preferably mounted in a suitably supported frame 60 having rollers 61 and 62 at its opposite ends respectively. A spur gear 63 is mounted on a shaft 64 which carries the roller 61, and meshes with a gear 65 mounted on a shaft 66 in bearings 67 carried on an extension arm 68 of the frame 19. A sprocket wheel 69 is also fast to the shaft 66 and is driven by a chain 70 from a sprocket wheel 71 on the shaft 56 of the roller 57, so that during rotation of the roller 57 to drive the drum 15, the chain 70 also drives the upper conveyor 12 to carry the rubber stream upward to a position where it is introduced between the two elastic belts 13 and 14.

Any suitable form of clutch mechanism may be used for controlling power from the shaft 56 to the chains 54 and 70. One suitable form of clutch is illustrated in Fig. 3 in which the sprocket wheels 55 and 71 are solidly connected together and formed with a clutch jaw 72 adapted to be engaged by a clutch jaw 73 in the form of a collar slidingly mounted on the shaft 56 and held against rotation thereon by a spline 74. A handle 75 is pivoted at its lower end as indicated at 76 in a support 77 of the standards 58, the handle having oppositely disposed pins 78 which ride in an annular groove 79 of the collar of the clutch jaw 73, so that when the handle is thrown to the left, the clutch jaws 72 and 73 are engaged and consequently power from the shaft 56 is transmitted to both sprocket wheels 55 and 71, thereby starting the machine in motion to perform its operations upon the stream of rubber stock R, which proceeds through the machine as described and eventually reaches the large roller 39, after which it drops on to a conveyor 80 and is carried away from the machine. The conveyor 80 is preferably in the form of an endless belt mounted at one end on a cylinder 81 having a shaft 82 to which there is secured a pulley 83 driven by a belt 84 from a pulley 85 on the shaft 21 of the cylinder 20.

It has been found that the rubber stream R tends to stick to the inner belt 14 and consequently may be carried around therewith over the idler rollers 28 and 24 and back into the machine when it should be delivered therefrom. In order to overcome this tendency there is provided at the top of the cylinder 20 a device adapted to constantly moisten the belt 14 and thereby prevent sticking of the rubber R thereto. This moistening device may be in the form of a liquid containing tank 86 mounted on supports 87 and having a roller 88 which dips into the liquid. The roller 88 transfers the liquid to another roller designated 89 which is preferably covered with flannel 90 or other suitable absorptive material and is in contact with the belt 14, so that the latter is always supplied with moisture during operation of the machine. The belt 13 may be equipped with a similar moistener, if needed.

In order to prevent the belts 13 and 14 from working to the sides of the drum 15 and to maintain them in cooperative working relation, means are provided for automatically shifting one or both of the belts upon deviation thereof from a predetermined course. For this purpose, the idler rollers 24 and 35 are provided with means operated by their respective belts 14 and 13 for automatically tilting the rollers 24 and 35 sufficiently to return the belts to their central working positions. To carry out this tilting operation, the links 42 and 26 which connect the rollers 35 and 24 respectively to the frame of the machine, are loosely pivoted so that the rollers 35 and 24 will be capable of tilting. Each of the idler rollers 24 and 35 are equipped with end frames 91 and 92 (see Figs. 4 and 5) which are preferably connected together by cross rods 93. A pair of sheaves 94 guide a cable 95, the free ends of which are securely fastened to stationary parts of the frame 19, as indicated at 96. The intermediate portion of the cable is secured at 96' to a rider 97 which has a pair of screw threaded openings, respectively 98 and 98', threaded in opposite directions, that is, one opening has a right hand thread and the other opening has a left hand thread. A pair of right and left hand threaded rods 99 and 100 are mounted in bearings 101 and 102 carried by frames 91 and 92, each threaded rod having attached thereto a disc 103 having a bevelled surface 104, preferably knurled. The discs 103 are located at each side of the belt slightly spaced from the edges thereof when the belts are running centrally on the drum 15. When either one of the belts deviates from a substantially central course the side edges of the belt run against the bevelled disc 103 and cause rotation thereof. This rotation of disc 103 revolves the screw threaded rod carried by the disc and that in turn causes the rider 97 to pull on cable 95 and thus tilt the roller 24 or 35 the amount necessary to shift the belts back to proper position. The two threaded shafts 99 and 100 are preferably connected together so that they will cooperate in shifting the rider 97 to which the intermediate portion of the cable 95 is secured. For this purpose each of the shafts 99 and 100 are provided with gears 105 connected together by idler gears 106, all of which are preferably enclosed in a housing 107 provided in the end frame 92. This tilting action takes place either to the right or the left, so that each shifting device controls its own belt in such manner that both of the belts are always maintained in alignment substantially centrally of the drum 15 and the two cooperating cylinders 20 and 32, during passage of the rubber stock R through the machine.

It is to be understood that while the described embodiment represents one way in which the machine may be constructed, it is obvious that various modifications and alterations may suggest themselves to those skilled in the art without departing from the principles underlying the invention. For an understanding of the scope of the invention, reference is therefore made to the accompanying claims.

Having thus described my invention, what I claim and desire to protect by Letters Patent is:

1. A machine for shrinking a continuous stream of unvulcanized rubber stock, comprising a plurality of endless elastic elements, means for advancing and maintaining said elements in stretched condition at a definite portion of their travel, said rubber stock being introduced between and gripped by the stretched portions, said means cooperating with said elements to permit gradual contraction of the stock gripping portions, whereby the rubber stock partakes of the contraction.

2. A machine for shinking a continuous stream of unvulcanized rubber stock, comprising a pair of advancing elastic belts cooperating to receive and grip said stock against motion relative to the belts, and means for maintaining said belts stretched at the zone where the unshrunk stock enters the grip thereof, said means being arranged to allow the belts to contract gradually as they advance beyond the belt stretching zone, whereby the rubber stock is mechanically shrunk by the contraction of the belts.

3. A machine for shrinking a continuous stream of unvulcanized rubber stock, comprising a plurality of superposed elastic belts adapted to receive and grip the rubber stock between them, a drum against which said elements are held under tension, means for rotating said drum, means for feeding said belts to the drum at a speed slower than the surface speed of the drum, whereby the belts are stretched between the feeding means and the drum, the rubber stock being carried around with the stretched belts and gripped tightly therebetween as the drum revolves said belts being arranged to slip on said drum after a predetermined length of travel around with the drum, the slipping of the belts allowing contraction thereof and a consequent consolidation of the rubber stock gripped between the belts.

4. A machine for shrinking a continuous stream of unvulcanized rubber stock, comprising a drum, a plurality of endless superposed belts disposed around a portion of the drum surface, cylinders upon which each of the belts are mounted, means for maintaining said belts under tension on said cylinders and against the surface of the drum, means for rotating said drum, means for rotating the cylinders at surface speeds less than that of the drum whereby the belts are stretched for a portion of their length, the rubber stock being gripped between the stretched portions, said belts, being arranged to gradually slip with relation to the drum after advancing a predetermined distance beyond said zone, whereby the rubber is condensed by the contraction of the belts, and means for varying the speed ratio between the cylinders and the drum, whereby to alter the degree of condensation.

5. A machine for shrinking a continuous stream of unvulcanized rubber stock, comprising a drum, a plurality of endless superposed belts disposed around substantially one half the circumference of said drum, cylinders upon which each of the belts are mounted, idler rollers cooperating with said belts to maintain the same under tension against the surface of said drum, means operated by the belts and coacting with said idler rollers for maintaining said belts in working position, means for rotating the drum, means for rotating the cylinders at surface speeds less than the surface speed of the drum, whereby the belts are stretched for a portion of their length, the rubber stock being entered between and gripped by the stretched portion, said belts being adapted to slip with respect to the drum after the belts have advanced beyond the stretching zone, whereby the rubber stock partakes of shrinkage resulting from contraction of the belts, and means for varying the ratio of speed differences between the drum and the cylinders.

6. A machine for shrinking a continuous stream of unvulcanized rubber stock, comprising means arranged to grip the stock, said means being adapted to contract, whereby to cause shrinkage of the gripped stock, and means for effecting such contraction.

7. A machine for shrinking a continuous stream of unvulcanized rubber stock, comprising expansible and contractible means adapted to grip the stock while in expanded condition and then to gradually contract, whereby the stock is condensed in accordance with the contraction, and means for effecting such expansion and contraction.

8. An apparatus for manipulating stock comprising in combination, a pair of endless elastic belts, means for conducting said belts in predetermined paths in a portion only of which they are in contact, means for stretching the belts in advance of their contact and for permitting them to contract while in contact, whereby a plastic stock adapted to shrink may be continuously introduced and held between said belts and condensed in the direction it tends to shrink.

9. A machine for treating stock comprising in combination a pair of endless elastic belts, a rotating member about a substantial portion of whose periphery both belts travel, and means in addition to said member for guiding and moving said belts at a lower velocity than the periphery of said member whereby the belts may be stretched between said means and said member, said means being so arranged with relation to said member as to permit stock to be introduced and delivered from between said belts.

10. A machine for treating stock comprising in combination a pair of endless elastic belts, a rotating member about a substantial portion of whose periphery both belts travel, means in addition to said member for guiding and moving said belts at a lower velocity than the periphery of said member whereby the belts may be stretched between said means and said member, said means being so arranged with relation to said member as to permit stock to be introduced and delivered from between said belts in advance and at the rear of said member, and means for maintaining the belts in superimposed cooperating working relation about said member.

11. That method of treating a length of unvulcanized rubber composition in a condition liable to shrink which consists in confining the composition and while confined gradually condensing it in the direction of the length of the composition.

12. The method of treating unvulcanized rubber composition in a condition liable to shrink, which consists in confining the composition between elastic elements, and then contracting said elements whereby the rubber composition is condensed in accordance with the contraction.

13. The method of treating unvulcanized rubber composition in a condition liable to shrink, which consists in gripping said composition by an element adapted to be contracted, and then contracting said element whereby the rubber gripped thereby partakes of the contraction.

14. An apparatus for treating unvulcanized rubber stock in a condition liable to shrink, comprising extensible and contractable means adapted to grip the unshrunk stock, and means for contracting the gripping means whereby the stock is condensed in the direction it tends to shrink.

15. An apparatus for condensing rubber stock, including in combination a pair of elastic belts cooperating to grip and condense the stock, and means controlled by the belts for preventing them from deviating from a predetermined course.

16. An apparatus for condensing rubber stock, including in combination a pair of elastic belts cooperating to grip and condense the stock, idler rollers for the belts, and means controlled by the belt edges for tilting said rollers whereby to maintain said belts in cooperative stock gripping relation and to maintain said belts in a given course.

17. An apparatus for condensing rubber stock, including in combination a pair of elastic belts arranged to grip and condense said stock, idler rollers for the belts, and belt centering devices comprising cables associated with said rollers and having their free ends held stationary, and means operated by the belts for shifting the cables in a manner to tilt the rollers, whereby the two belts are maintained in a predetermined course and in stock gripping relation.

18. A machine for shrinking rubber stock, comprising means adapted to contact with and confine said stock, means for contracting said confining means whereby the stock is caused to shrink, and means for treating said confining means whereby to prevent the stock from adhering thereto.

19. A machine for shrinking unvulcanized rubber stock, comprising a pair of elastic belts adapted to grip and confine said stock between them, and means for causing contraction of said belts whereby the rubber stock is condensed, and means for applying a substance to said belts adapted to prevent a stock from sticking thereto.

20. A machine for shrinking a length of unvulcanzied rubber stock comprising a pair of elastic belts adapted to grip the stock between them, means for operating said belts in a manner to contract the same whereby the rubber stock held by the belts is condensed, and a moistening device associated with said belts for preventing the stock from adhering thereto.

21. Strip-feeding apparatus comprising an elastic endless conveyor belt adapted to move forward in contact with the strip, means for driving the belt at a relative fast speed at its strip-receiving position, and means for driving the belt at a relatively slow speed at its strip-delivering position.

22. Strip-feeding apparatus comprising a pair of elastic endless conveyor belts adapted to engage the opposite faces of the strip to feed the same between them, means for driving the belts at relatively fast speed at their strip-receiving position, and means for driving them at a relatively slow speed at their strip-delivering position.

Signed at Hartford, county of Hartford, State of Connecticut, this 12th day of September, 1928.

HECTOR V. LOUGH.